SEMIAUTOMATIC DIVERTER FOR TELEPHONE CALLS

Filed March 11, 1966 2 Sheets-Sheet 1

INVENTORS
EDWARD RUDO,
SIDNEY GERSTEIN,
ROBERT G. SMITH

BY Donald D. Denton
ATTORNEY

SEMIAUTOMATIC DIVERTER FOR TELEPHONE CALLS

Filed March 11, 1966 2 Sheets-Sheet 2

INVENTORS
EDWARD RUDO,
SIDNEY GERSTEIN,
ROBERT G. SMITH
BY Donald D. Denton
ATTORNEY 3,506,792

SEMIAUTOMATIC DIVERTER FOR TELEPHONE CALLS

Edward Rudo, 5809 Jonquil Ave. 21215; Sidney Gerstein, 716 Glenwood Ave. 21212; and Robert G. Smith, 844 Reverdy Road 21212, all of Baltimore, Md.

Filed Mar. 11, 1966, Ser. No. 533,506
Int. Cl. H04m 5/08
U.S. Cl. 179—42 3 Claims

ABSTRACT OF THE DISCLOSURE

A semiautomatic diverter for diverting telephone calls comprising first and second telephones located at a predetermined site, a manually actuated call holding device, associated with these telephones for maintaining a telephone link between the first telephone and a randomly, remotely located third telephone, manually actuated means for establishing a telephone link between the second telephone and a selected remotely located fourth telephone and a manually actuated transfer device for establishing a telephone link between the first and second telephones whereby a telephone link is established between the third and fourth telephones via the telephone link between the first and second telephones, monitoring means coupled to the transfer device for detecting audio frequencies in the telephone link between the third and fourth telephones and deactuating means associated with the monitoring means for deactuating the transfer device so that the link between the third and fourth telephone is broken after no audio frequencies are detected for a predetermined delay period.

This invention is a device for semiautomatically diverting or relaying a telephone call without special central telephone installations, central memory facilities or leased line circuits, yet providing the capability of a low density telephone call switch board. This invention additionally provides a semiautomatic call diverter for establishing telephone links between two or more telephones which may be located at a common site or at remote locations.

There presently exists a need for semiautomatic diverter system for telephone calls in which an operator manually connects an incoming call to either a telephone located in close proximity to the diverter or to a telephone located at a remote site. One necessary and desirable feature of a diverter of this type is the capability of the operator to first divert or connect the call to a selected telephone and then to be able to direct her time to performing other tasks. This requires a system capability of at least automatic reset, or to say it otherwise, the diverter must return to its normal condition after the completion of the diverted call.

A diverter of this general nature must also be relatively simple and inexpensive, yet accurate, compatible with existing telephone systems and independent of central telephone facilities.

A semiautomatic telephone call device according to our invention advantageously provides the aforementioned characteristics, operating conditions and diverter capability.

According to our invention, two separate telephones are used, one being the subscriber's regular telephone and the other being the subscriber's private telephone. These two telephones are connected at the subscriber's residence or place of business in such a manner that all incoming telephone calls to either telephone may be manually diverted through the other telephone to a selected remote telephone.

When a telephone call is received, an operator activates a manual call hold device which holds the telephone link between the remote calling telephone and one of the subscriber's telephones. The operator then manually calls a selected remote telephone located at the site of the called party and manually activates a transfer and switching device. The function of the transfer and switching device is to establish a telephone link between the remote calling telephone and the selected remote telephone.

A voice operated device often called a voice operated xmitter (VOX) is also provided for detecting when the diverted telephone call has been completed whereupon it starts a timer device which at the completion of its timing cycle, resets the transfer and switching device, thus putting the diverter in condition for relaying or diverting any subsequent incoming calls.

Our invention also contemplates provision of central call selecting capability whenever it is desired to locate the subscriber's regular and private telephones at a remote site. By this arrangement, the operator can answer either one of the subscriber's telephones and divert these calls to a selected remote telephone, yet permitting location of the subscriber's telephones at a site remote from the operator.

It is therefore a primary object of our invention to provide a semiautomatic telephone call diverter which is associated with the subscriber's telephones that will receive an incoming call and connect the incoming call to a remotely located telephone.

Another object of our invention is to provide a telephone call diverter which is physically associated with the subscriber's telephones and manually activated into operation by an operator after a random remote telephone calls one of the subscriber's telephones which establishes a telephone connection between the random remote telephone and a selected remote telephone, thus diverting the telephone call through the subscriber's regular telephone to the selected remote telephone.

Another object of our invention is to provide a telephone call-diverter that semiautomatically connects any call made to one of the subscriber's telephones to a selected remote telephone, yet not requiring special central telephone facilities, central memory facilities, leased lines or a complex switch board.

Still another object of our invention is to provide a telephone call diverter capable of functioning as a system for establishing conference calls between the subscriber's telephones and remotely located telephones.

Yet another object of our invention is to provide a telephone call diverter which is simple to install, compatible with existing telephone systems, relatively inexpensive, and independent of central telephone facilities.

These and further objects and advantages will become more apparent upon reference to the following description and claims and the appended drawings wherein:

Figure 1:
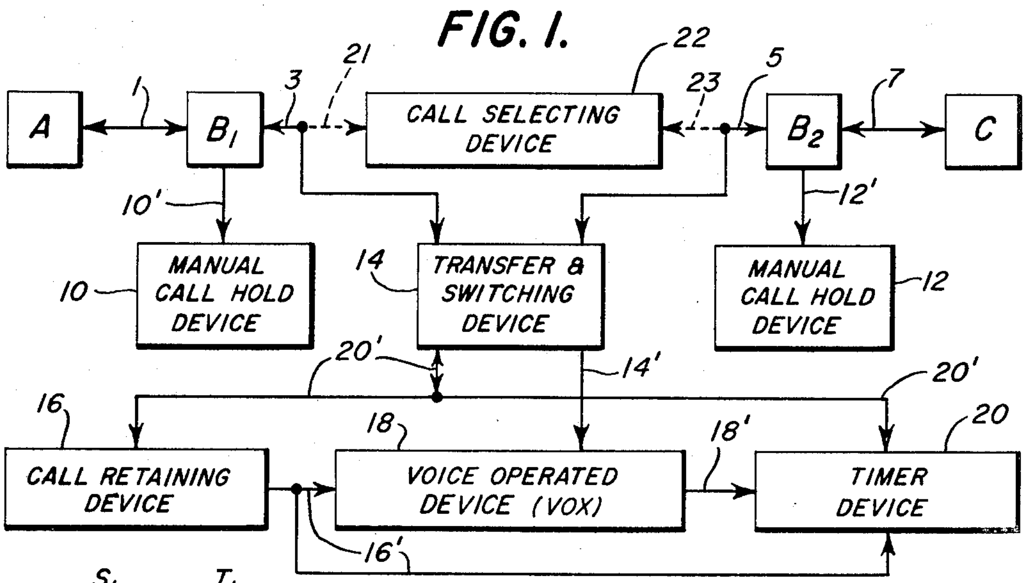
FIGURE 1 is a block diagram of an embodiment of the semiautomatic diverter for telephone calls according to our invention.

FIGURE 1 is a block diagram of an embodiment of our novel semiautomatic diverter for telephone calls, and graphically includes two conventional subscriber telephone sets, $B_1$ and $B_2$. Telephone $B_1$ is of the type having a listed or published telephone number, and shall hereinafter be referred to as the subscriber's regular telephone, while the telephone $B_2$ is of the type that has an unlisted or unpublished telephone number, and shall hereinafter be referred to as the subscriber's private telephone. It is to be understood, however, that two regular telephones or two private telephones may be used in lieu thereof.

The block A of FIGURE 1 represents any remote telephone which is linked for two-way communication with the subscriber's regular telephone $B_1$, while block C represents any remote telephone which is linked for two-way communication with the subscriber's private telephone $B_2$. The primary function of our diverter is to semiautomatically provide a two-way communication link between the telephones A and C when telephone A calls telephone $B_1$.

It should be noted at this point that the communication link between telephones A and $B_1$, i.e., conductor means 1, is random; whereas the communication link between telephones C and $B_2$, i.e., conductor means 7, is selected by the operator depending upon the party being called by A and his location.

The circuit connections of our diverter in accordance with the embodiment of FIGURE 1 are as follows:

The subscriber's telephone $B_1$ is coupled via conductor means 3 to the transfer and switching device 14; while the subscriber's telephone $B_2$ is coupled via conductor means 5 to the transfer and switching device 14. The two-way communication link between the random remote telephone A and the selected remote telephone C includes conductor means 1, telephone $B_1$, conductor means 3, the transfer and switching device 14, conductor means 5, telephone $B_2$, and conductor means 7.

The subscriber's telephones $B_1$ and $B_2$ are respectively connected to the manual call hold devices 10 and 12 via conductor means 10′ and 12′, respectively. The transfer and switching device 14 is also coupled, via conductor means 14′, to the VOX 16, which in turn is coupled to a timer device 20 via conductor means 18′. The call retaining device 16 is connected to both the VOX 18 and the timer device 20 via conductor means 16′.

The diverter circuit is completed by connecting the timer device 20 back to the transfer and switching device 14 and back to the call retaining device 16 via conductor means 20′.

The manual call hold devices 10 and 12 are preferably simple mechanical switches which are capable of maintaining a two-way communication link between their corresponding subscriber's telephones $B_1$ and $B_2$ and their respective remote telephones A and C.

The transfer and switching device 14 is preferably a complex relay mechanism which is mechanically actuated by the operator. Its primary functions are to connect telephones $B_1$ and $B_2$, and to couple the audio frequencies in the telephone link between these telephones to the VOX 18.

The call retaining device 16 is preferably a complex relay mechanism which is mechanically actuated by the operator. Its primary function is to maintain operating power for the VOX 18 and timer device 20, thus insuring that the two-way communication link between the remote telephones A and C is maintained until such time as a predetermined condition occurs, e.g., audio frequencies in the telephone link are no longer present, whereupon the diverter is automatically returned to its normal condition.

The VOX 18 is preferably and basically a multistage amplifier operating in the audio range of frequencies. It is capable of opening switch means in the presence of audio frequency signals at its input side. VOX 18 monitors the transfer and switching device 14 and controls the timer device 20. Thus it will be appreciated that the VOX 18 functions as an audio actuated monitoring means for monitoring telephone communications passing through the transfer and switching device 14.

The timer device 20 is preferably of the type having automatic reset capabilities and being adjustable for variable length time cycles. It is capable of opening switch means when its time cycle expires, and is actuated by the VOX 18.

It is to be understood at this point that the term "telephone" as used herein is not limited to conventional subscribers' telephones, but includes electric, electromagnetic or electronic devices which are responsive to various communication signals transmittable over telephone lines.

The operation of the circuit of FIGURE 1 is as follows:

When the random remote telephone A calls the subscriber's telephone $B_1$, the operator conventionally answers the call, and if the party called is not at the site of the subscriber's telephones but can be reached at a known remote telephone, such as the remote telephone C, the operator maintains or holds the telephone link between the telephones A and $B_1$, by actuating the manual call hold device 10.

The operator then calls the known or selected remote telephone C via the subscriber's telephone $B_2$, thus establishing a telephone link between telephones $B_2$ and C.

Next, the operator manually actuates the transfer and switching device 14 and the call retaining device 16.

When the transfer and switching device 14 is actuated the subscriber's telephones $B_1$ and $B_2$ are connected, thus establishing a two-way communication link between remote telephones A and C via conductor means 1, telephone $B_1$, conductor means 3, transfer and switching device 14, conductor means 5, telephone $B_2$ and conductor means 7. In addition, the transfer and switching device 14 couples the audio signals in the telephone link between telephones A and C to the VOX 18 via conductor means 14′. VOX 18 now monitors the telephone link between telephones A and C.

When the call retaining device is actuated, power such as 110 volts AC, is coupled to the VOX 18 and to the timer device 20 via conductor means 16′.

When the telephone link between telephones A and C is interrupted, i.e., the telephone call has been completed, the VOX 18 detects the absence of audio frequencies or some other predetermined condition and energizes the timer device 20 via conductor means 18′.

When the timer device 20 completes its cycle of operation, e.g., a minute or so, it de-energizes the transfer and switching device 14 and call retaining device 16 via conductor means 20′, thus putting the diverter in condition to transfer any subsequent calls made to telephone $B_1$.

At this point in the operation of the diverter, the telephone link between telephones $B_1$ and $B_2$ is broken; the electrical connection between the transfer and switching device 14 ad VOX 18 is broken; and the electrical connections between the call retaining device 16 and the VOX 18 and timer device 20 are also broken.

It is contemplated that visual indicators may be included in the manual hold devices 10 and 12 to alert the operator that an original call is coming in on the subscriber's telephones $B_1$ and $B_2$ so that the operator may manually divert the call, and that a diverted call has been completed so that the operator may manually deactivate the manual call hold devices.

FIGURE 1 also shows a call selecting device 22 which is connected to the conductor means 3 and 5 via conductor means 21 and 23, respectively. The call selecting device 22 is connected in circuit by dot-dash lines since it is an additional feature selectively included when it is desired to locate the subscriber's telephones $B_1$ and $B_2$ at a place physically remote from the operator. By this arrangement, the operator can answer the subscriber's telephones $B_1$ and $B_2$ and thereafter manually actuate the diverter.

Figure 2:
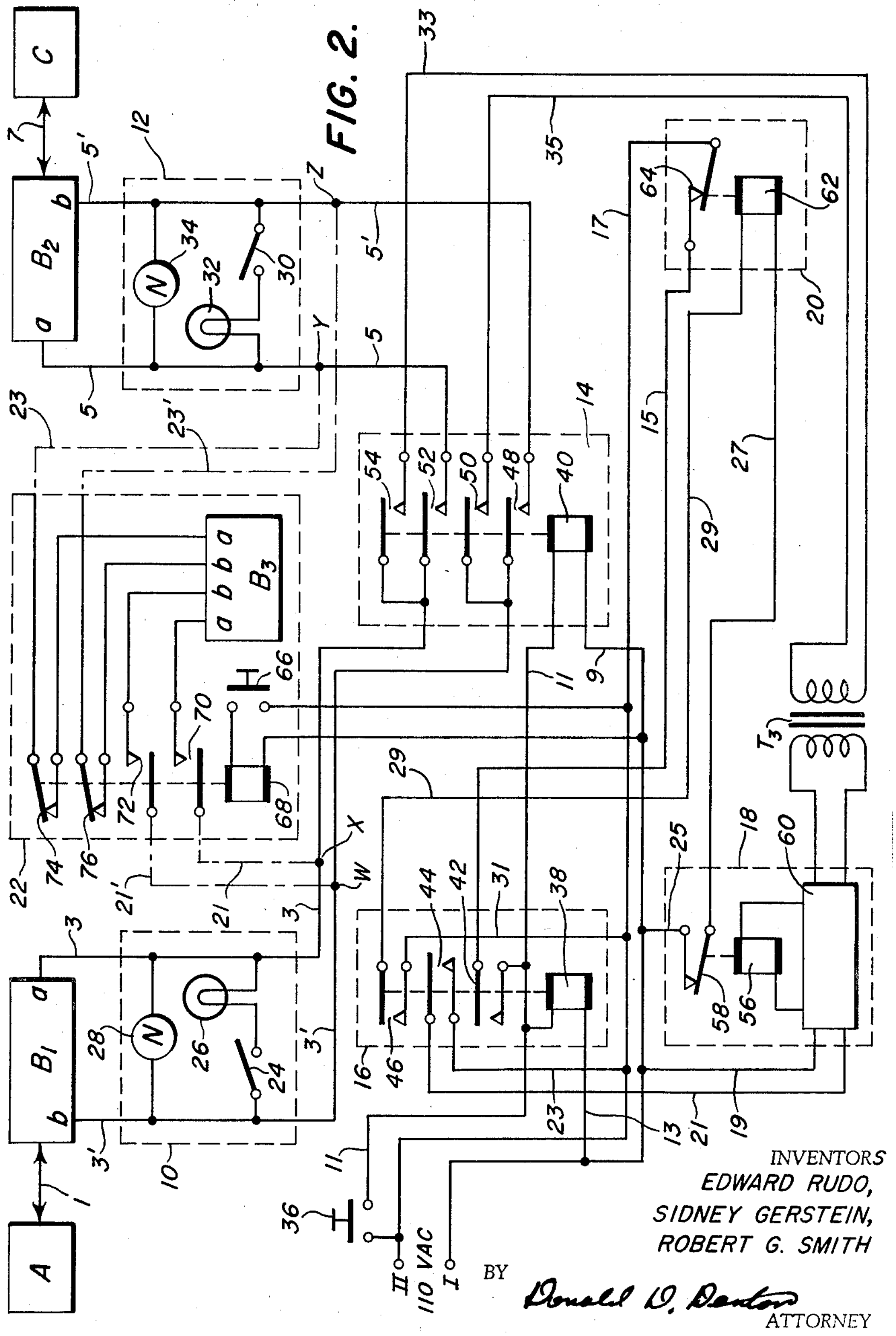
FIGURE 2 is a preferred detailed circuit of the present invention in accordance with the embodiment of FIGURE 1, with the conventional telephones and the voice operated device (VOX) of the circuit shown in block diagram form, and with an alternate embodiment shown in dot-dash lines.

The call selecting device 22 is preferably a complex relay mechanism which as shown in FIGURE 2 includes a third phone $B_3$ and which is manually actuated by the operator. Its primary function is to establish a telephone link between the operator's telephone, (i.e., $B_3$) and the remote telephone A, for example, via the subscriber's telephone $B_1$, and to establish a telephone link between the operator's telephone and the remote telephone C, via the subscriber's telephone $B_2$.

When the call selecting device 22 is included the other elements of the circuit of FIGURE 1 operate in substantially the same manner as above described.

FIGURE 2 depicts a preferred detailed circuit of the present invention in accordance with the embodiment of FIGURE 1 together with an alternate embodiment of our invention shown in dot-dash lines. In this detailed circuit, the elements making up the blocks of FIGURE 1 are shown within the confines of dashed line blocks and are appropriately referenced with the same numerals as the corresponding blocks of FIGURE 1. Additionally, in this detailed circuit the conventional telephones A, $B_1$, $B_2$ and C, as well as the additional conventional telephone $B_3$ of the call selecting device 22, and the VOX 18 are not shown in detail. A preferred detailed circuit for the VOX 18 will be described below regarding FIGURE 3.

The call hold devices 10 and 12 respectively comprise single-pole, single-throw switches 24 and 30, which respectively couple conventional filament bulbs 26 and 32 across the subscriber's telephones $B_1$ and $B_2$, i.e., respectively across the conductors 3–3′ and 5–5′; and neon bulbs 28 and 34 which are also respectively connected across the subscriber's telephones $B_1$ and $B_2$ between conductors 3–3′ and 5–5′.

The transfer and switching device 14 comprises a relay coil 40 which controls single-pole, single throw switches 48, 50, 52, and 54. The single-pole, single-throw switches 48 and 52 respectively connect the conductors 3–3′ of telephone $B_1$ to the conductors 5–5′ of the telephone $B_2$, whereas the single-pole single-throw switches 50 and 54 respectively couple the audio frequencies on the conductors 3–3′ and 5–5′ to the VOX 18 via conductors 33 and 35, respectively. Call retaining transformer $T_3$ is connected across conductors 33 and 35. It functions to prevent change in the line voltage in conductors 3–3′ and 5–5′ that might disrupt the service of the telephones connected into the call diverter system.

The call retaining device 16 comprises a relay coil 38 which controls single-pole, single-throw switches 42, 44, and 46. The single-pole, single-throw switch 42 maintains voltage across the relay coils 38 and 40 and is connected between terminals I and II of a 110-volt A.C. source, for example, while single-pole, single-throw switches 44 and 46 respectively connect the 110-volt A.C. source to the VOX 18 and timer device 20.

Connected across the relay coils 38 and 40 is a manually operable switch 36 that is spring biased to be normally opened, and which when closed, connects, at least momentarily, the 110-volt A.C. source across the relay coils 38 and 40, thus energizing the transfer and switching device 14 and call retaining device 16.

The VOX 18 comprises amplifier circuits 60 (not shown in detail), and a relay coil 56, which controls a single-pole, single throw switch 58.

The timer device 20, which preferably is a conventional timer motor, is merely shown in schematic form wherein the motor coil 62 thereof controls an auxiliary single-pole, single-throw switch 64. Motor coil 62 has its one end connected through switch 46 to the No. II terminal of the 110-volt A.C. source and its other end connected through switch 58 to the No. I side of the 110-volt A.C. source.

The operation of the circuit of FIGURE 2 is as follows: When a random remote telephone, e.g., telephone A, calls the subscriber's telephone $B_1$, the neon bulb 28 glows, thus notifying the operator of the incoming call. The operator answers the call in a conventional manner, and if the called party is not located at the site of the diverter but as some other known remote site, the operator closes the normally open switch 24. This maintains the telephone link between telephones A and $B_1$ and causes the filament bulb 26 to glow, thus providing a visual indication that a call has been received on telephone $B_1$. The circuit for notifying the operator of an incoming call may be traced from the *a* communication terminal of telephone $B_1$, conductor 3, neon bulb 28, conductor 3′ to the *b* communication terminal of telephone $B_1$; while the circuit for maintaining the telephone link between telephones A and $B_1$ may be traced from the *a* terminal of telephone $B_1$, conductor 3, filament bulb 26, normaly open contacts of switch 24, conductor 3′ to the *b* terminal of telephone $B_1$.

The operator next calls the remote telephone C through the subscriber's telephone $B_2$. The remote telephone C is located at the site where the called party is known to be.

When in a like maner, telephone $B_2$ is rung, the neon bulb 34 glows, thus indicating that a call is being made into the subscriber's telephone $B_2$. The circuit for indicating that telephone $B_2$ is being rung may be traced from the *a* communication terminal of telephone $B_2$, conductor 5, neon bulb 34, conductor 5′ to the *b* communication terminal of telephone $B_2$.

It should be noted here that the manual call hold device 12 also includes a series connected single-pole single throw switch 30 and a filament bulb 32, which are connected across terminals *a* and *b* via conductors 5–5′. Switch 30 and bulb 32 are included so that semiautomatic diverting of telephone calls may be accomplished when the incoming call to be diverted is made to the subscriber's telephone $B_2$. For purposes of description only, the operation of our semiautomatic diverter is being described when the incoming call is made to the subscriber's telephone $B_1$. The mode of operation is substantially the same when the incoming call is made to telephone $B_2$ but for the fact that switch 30 rather than switch 24 is closed by the operator and the outgoing call to a known remote telephone would be made via telephone $B_1$ rather than telephone $B_2$.

After the operator establishes a telephone link between telephones $B_2$ and C, she closes switch 36, thus placing 110 volts A.C. across the relay coils 38 and 40. The circuit for energizing coil 40 may be traced from the No. I terminal of the 110-volt A.C. source, conductor 9, coil 40, conductor 11, switch 36, to the No. II terminal of the 110-volt A.C. source; while the circuit for energizing coil 38 may be traced from the No. I terminal of the 110-volt A.C. source, conductor 13, coil 38, conductor 11, switch 36 to the No. II terminal of the 110-volt A.C. source.

When relay coil 38 is energized the switch blades of switches 42, 44 and 46 swing downwardly from that shown in FIGURE 2, thus closing these normally open switches.

When switch 42 closes it overrides switch 36 and thus keeps 110 volts A.C. across the coils 38 and 40. The circuit for the override or coil voltage maintaining switch may be traced from the No. I terminal of the 110-volt A.C. source, conductors 9 and 13, coils 38 and 40, switch 42, conductor 15, switch 64 of the timer device 20, conductor 17 to the No. II terminal of the 110-volt A.C. source. So long as this circuit remains closed, the transfer and switching device 14 and call retaining device 16 will remain energized.

When switch 44 closes, 110 volts A.C. is applied to the VOX 18. The circuit for applying voltage to VOX 18 may be traced from the No. I terminal, conductor 19, VOX amplifier circuits 60, conductor 21, switch 44, conductor 23 to the No. II terminal.

When switch 46 closes, 110 volts A.C. is applied to the timer device 20 or more specifically across the motor coil 62. The circuit for applying voltage to the timer device 20 may be traced from the No. I terminal, conductor 25, switch 58, conductor 27, coil 62, conductor 29, switch 46, conductor 31 to the No. II terminal.

When coil 40 is energized the switch blades of switches 48, 50, 52 and 54 swing downwardly from that shown in FIGURE 2, thus closing these normally open switches.

When switches 48 and 52 close, the *a* and *b* terminals of the subscriber's telephones $B_1$ and $B_2$ are respectively connected together via conductors 3–3′ and 5–5′. By this operation, the transfer and switching device 14 operates to close the communication link between the telephones $B_1$ and $B_2$ and in effect establishes a communication link between the remote telephones A and C.

When switches 50 and 54 are closed, the *a* and *b* terminals of the subscriber's telephones $B_1$ and $B_2$ are connected to the VOX 18 via conductors 33 and 35, thus coupling the audio frequencies thereon into the VOX amplifier circuits 60. It will be recalled that at this same moment power is applied to the VOX 18 via conductors 19 and 21 when the relay coil 38 is energized.

The VOX amplifier circuits 60 are adapted to develop an output across the relay coil 56 which will open normally closed switch 58 whenever audio frequencies are coupled thereto, i.e., when there is a communication link between remote telephones A and C.

When switch 58 is opened, the timer device 20 is de-actuated and automatically reset. In this respect, so long as switch 58 remains open, i.e., audio frequencies are present, the timer device 20 cannot run through its time cycle.

When the communication link between telephones A and C is broken, the flux field of coil 56 collapses and switch 58 returns to its normally closed condition. At this time, timer device 20 is actuated and when it completes its time cycle, switch 64 is caused briefly to open. The time cycle of timer device 20 may be in the neighborhood of fifteen seconds to a few minutes, so that short intervals of silence on the communication link between telephones A and C will not result in switch 64 being prematurely opened. Other desirable time constants may be provided to accommodate various forms of communications between telephones A and C. Additionally, audio frequency sensitivity may be excluded and a tone or reset frequency used to actuate the VOX 18 when the communication link between telephones A and C is broken.

When switch 64 is opened, the 110-volt A.C. source is removed from across coils 38 and 40, thus deactuating both the transfer and switching device 14 and the call retaining device 16. This causes the associated switches of these coils to return to their normal positions, i.e., as shown in FIGURE 2.

At this point in the operation of our diverter, the transfer and switching device 14, call retaining device 16, VOX 18 and timer device 20 are in proper condition for semiautomatic diverting of any subsequent telephone calls to the subscriber's telephones $B_1$ and $B_2$.

It should be noted here that when the telephone link between the remote telephones A and C is broken, the diverted call has been completed. When this occurs the operator opens switch 24, thus manually de-actuating the manual call hold device 10.

Figure 3:
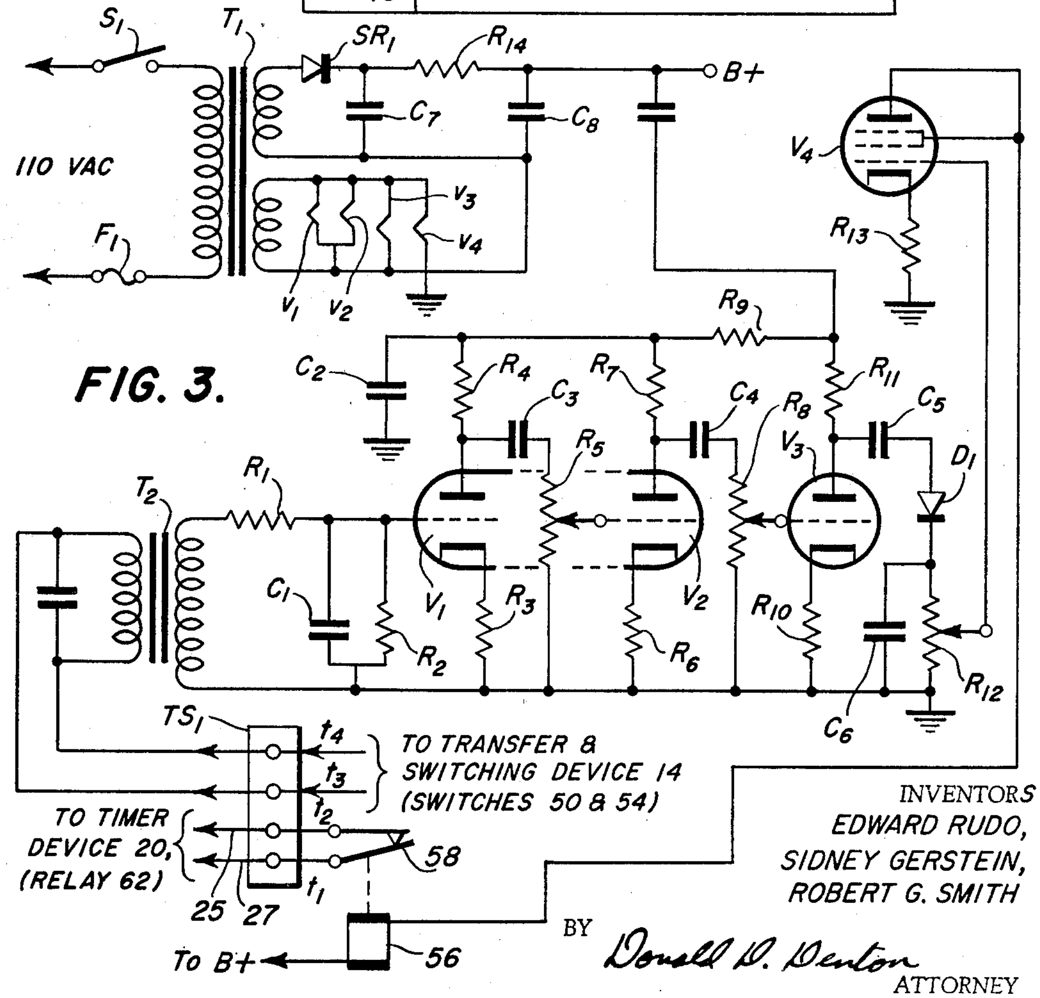
FIGURE 3 is a detailed circuit of a preferred embodiment of a voice operated device (VOX) which may be used in the circuits of FIGURES 1 and 2.

FIGURE 3 depicts a detailed circuit of a preferred embodiment of a voice operated device (VOX) which may be utilized as the VOX 18 of FIGURES 1 and 2.

VOX 18 is basically a multistage amplifier and is preferably tuned to audio frequencies. It has its own power supply circuit for developing B+ and filament voltages, and has transformer input coupling means matched to the telephone line impedance, e.g., a 600-ohm input transformer.

VOX 18 comprises three triode vacuum tube amplifiers having triode sections or triodes $V_1$ and $V_2$ in one duo-triode vacuum tube and triode section $V_3$ in a single vacuum tube; a pentode vacuum tube amplifier $V_4$; a power transformer $T_1$; and audio frequency input transformer $T_2$; and the relay coil 56 and its associated single-pole, single-throw switch 58.

The power transformer $T_1$ has one end of its primary connected to the No. I side of the 110-volt A.C. source via an ON-OFF switch $S_1$, while its other end is connected to the No. II side of the 110-volt A.C. source via a fuse $F_1$.

Transformer $T_1$ has two secondaries, one for developing the B+ voltage and the other for developing filament voltages for the cathodes of triodes $V_1$, $V_2$, and $V_3$, and for the cathode of pentode $V_4$. The upper secondary of transformer $T_1$ has one end connected to ground and the other end connected to the B+ terminal via a series circuit comprising a silicon rectifier $SR_1$ and a limiting resistor $R_{14}$. Conventional filter capacitors $C_7$ and $C_8$ are connected between ground and the ends of limiting resistor $R_{14}$.

The circuit of the upper secondary of transformer $T_1$ is commonly called a half-wave rectifier and for that reason any well known half-wave rectifier may be used in lieu thereof for developing the necessary B+ voltage.

The lower secondary of transformer $T_1$ develops the necessary filament voltages in a conventional manner as is graphically shown by the filaments numeraled $v_1$ through $v_4$.

The audio input transformer $T_2$ is connected to terminals $t_3$ and $t_4$ of the terminal strip $TS_1$ and it is these terminals upon which the input signals being monitored are present. By way of example, terminals $t_3$ and $t_4$ are shown to be connected to the single-pole, single-throw switches 50 and 54 of the transfer and switching device 14 of FIGURE 2.

As mentioned above, normally open switches 50 and 54 are closed when the switch 36 is closed by the operator thus coupling the audio signals thereon to the VOX 18.

Audio input transformer $T_2$ has its primary connected across terminals $t_3$ and $t_4$, whereas one end of its secondary is connected to the control grid of the triode $V_1$ via limiting resistor $R_1$, while the other end of its secondary is grounded.

The triode $V_1$ is connected in circuit as follows:

The control grid is connected to ground via grid-lead resistor $R_2$ and bypass capacitor $C_1$; the cathode is connected to ground via cathode bias resistor $R_3$; and its anode is connected to B+ via the load resistors $R_4$ and $R_9$. The capacitor $C_2$ in the anode circuit of triode $V_1$ is a conventional filter capacitor.

The amplified output signals of triode $V_1$ are developed across resistor $R_4$ and are coupled to the control grid of triode $V_2$ via the series connected capacitor $C_3$ and center-tapped resistor $R_5$. The slider of resistor $R_5$ is connected to the control grid of triode $V_2$.

Triode $V_2$ is connected in the circuit of FIGURE 3 as follows:

The control grid is connected to ground via the lower section of resistor $R_5$ which functions as a grid-leak resistor; the cathode is connected to ground via cathode bias resistor $R_6$; and the anode is connected to B+ via load resistors $R_7$ and $R_9$.

The amplified output signals of triode $V_2$ are developed across resistor $R_7$ and are coupled to the control grid of triode $V_3$ via the series connected capacitor $C_4$ and center-tapped resistor $R_8$. The slider arm of resistor $R_8$ is connected to the control grid of triode $V_3$.

Triode $V_3$ is connected in the circuit of FIGURE 3 as follows:

The control grid is connected to ground via the lower section of resistor $R_8$, which also functions as a grid-leak resistor; the cathode is connected to ground via cathode bias resistor $R_{10}$; and the anode is connected to B+ via the load resistor $R_{11}$.

The amplified output signals are developed across load resistor $R_{11}$ and are coupled via coupling capacitor $C_5$ to the anode of diode $D_1$, which has its cathode connected to ground via center-tapped resistor $R_{12}$. A by-pass capacitor $C_6$ is connected across resistor $R_{12}$. The slider arm of resistor $R_{12}$ is connected to the control grid of pentode $V_4$.

Referring now to the output pentode $V_4$, this vacuum tube has its control grid connected to the slider arm of resistor $R_{12}$; its cathode connected to ground via resistor $R_{13}$; its screen electrodes conventionally biased by directly connecting them to the anode of pentole $V_4$; and its anode connected to B+ via relay coil 56.

The operation of the circuit of FIGURE 3 is as follows:

In the absence of audio signals at the input terminals $t_3$ and $t_4$ terminal strip $TS_1$, the circuit must be first adjusted so that the current flow through relay coil 56 (which in some cases may be practically nil) is insufficient to open the normally closed switch.

With ON-OFF switch $S_1$ closed, there are three adjustments to be made. First, resistor $R_5$ is adjusted for desirable gain control; second, resistor $R_8$ is adjusted for desirable amplifier sensitivity; and last, resistor $R_{12}$ is adjusted for providing the desirable control grid bias for the output pentode $V_4$. The foregoing adjustments are made so that normally closed switch 58 will remain closed in the absence of audio signals at the input terminals $t_3$ and $t_4$; whereas switch 58 will be opened by relay coil 56 when audio signals are present.

When audio signals are present at terminals $t_3$ and $t_4$, they are amplified by triodes $V_1$, $V_2$, and $V_3$, whereupon a threshold bias voltage is developed across resistor $R_{12}$ and coupled to the control grid of pentode $V_4$. This causes the pentode $V_4$ to conduct heavily and thus draw more anode current thereby causing the relay coil 56 to develop a flux field sufficient to open the normally closed switch 58.

It will be recalled that switch 58 is connected in series with the coil 62 of the timer device 20, and for this reason when switch 58 opens, the timer device 20 is prevented from running through its time cycle.

When audio signals are no longer present on input terminals $t_3$ and $t_4$, to wit, the diverted telephone call between the remote telephones A and C is completed, the bias voltage developed across resistor $R_{12}$ drives pentode $V_4$ into a low conducting or nonconducting state, thus no longer drawing sufficient current to hold the switch 58 open.

When switch 58 returns to its normally closed condition, coil 62 is energized and timer device 20 commences to run through its time cycle, the completion of which causes switch 64 to open, thus de-energizing the diverter as above described in detail respecting the circuits of FIGURES 1 and 2.

Referring again to FIGURE 2, there is shown an alternate embodiment of our invention wherein the call selecting device 22 is provided for permitting the operator to be located at a site remote from the subscriber's telephones $B_1$ and $B_2$, yet enabling her to answer these telephones and makes calls through them to remote telephones for perfecting semiautomatic diverting of incoming calls.

This embodiment of our invention entails the inclusion of conductor means 21–21′ and 23–23′, switch 66, relay coil 68, single pole, single-throw switches 70, 72, 74 and 76 and conventional telephone $B_3$. These additional elements are connected in circuit as follows:

Switch 66 and coil 68 are connected in series between the No. I and II sides of the 110-volt A.C. source. Coil 68 controls the normally open switches 70 and 72 and the normally closed switches 74 and 76.

Conductor means 21–21′ are respectively connected to switches 70 and 72, which in turn are respectively connected to a first pair of *a* and *b* terminals of telephone $B_3$.

Conductor means 23–23′ are respectively connected to switches 74 and 76, which in turn are respectively connected to a second pair of *a* and *b* terminals of telephone $B_3$.

Conductor means 21 and 23 are connected to conductor means 3 and 5 via terminals X and Y; while conductor means 21′ and 23′ are connected to conductor means 3′ and 5′ via terminals W and Z.

The operation of this alternate embodiment of our diverter is as follows:

When telephone A calls telephone $B_1$, the operator closes switch 66 which energizes coil 68, opens switches 74 and 76, and closes switches 70 and 72, thereby connecting telephone $B_3$ into the *a–b* circuit of telephone $B_1$. This permits the operator to answer the incoming call.

After the operator has closed switch 24 to hold the incoming call, she opens switch 66 which de-energizes coil 68, opens switches 70 and 72, and closes switches 74 and 76, thereby connecting telephone $B_3$ into the *a–b* circuit of telephone $B_2$. This permits the operator to call the selected remote telephone C through telephone $B_2$.

The operator then closes switch 36 thereby actuating the remaining elements of our diverter. The remaining elements of the circuit of FIGURE 2, as modified, operate in the same manner as above described in detail.

It will be apparent here that this alternate embodiment of our invention advantageously permits the operator to be located remote from the subscriber's telephones $B_1$ and $B_2$, yet permit semiautomatic diverting of incoming calls thereto.

For exemplary purposes only, the following elements were found to be highly satisfactory for assembly of our semiautomatic diverter:

Relay coils, 38, 40, 56, 62 and 68—Potter and Brumfield, 110 volt A.C.
Timer motor 20—Hayden
Filament bulbs 26 and 32—24-volt D.C.
Neon bulbs 28 and 34—NE54–A
Resistors—½ watt, 10% (unless stated otherwise):
- $R_1$—47,000 ohms
- $R_2$—2.2 megohms
- $R_3$—2,200 ohms
- $R_4$—100,000 ohms
- $R_5$—100,000 ohms (audio-taper potentiometer)
- $R_6$—2,200 ohms
- $R_7$—100,000 ohms
- $R_8$—100,000 ohms (audio-taper potentiometer)
- $R_9$—22,000 ohms
- $R_{10}$—2,200 ohms
- $R_{11}$—100,000 ohms
- $R_{12}$—7.5 megohms
- $R_{13}$—1,500 ohms
- $R_{14}$—470 ohms (1 watt)

Capacitors: Ceramic disk, 500-volt (unless stated otherwise):
- $C_1$—.001 microfarad
- $C_2$—20.00 microfarads (450-volt, electrolytic)
- $C_3$—.01 microfarad
- $C_4$—.01 microfarad
- $C_5$—.01 microfarad
- $C_6$—.1 microfarad
- $C_7$—20 microfarads (450-volt, electrolytic)
- $C_8$—20.00 microfarads (450-volt, electrolytic)

Transformers:
- $T_1$—125-volt, 50 ma., 6.3 volts, 2 amps
- $T_2$—600-ohm primary, 60,000-ohm secondary
- $T_3$—500-ohm primary, 500-ohm secondary Silicon rectifier:
- $SR_1$—750 ma. 200 PIV Vacuum tubes:
- $V_1$ and $V_2$—12 AX 7
- $V_3$—6 AB 4
- $V_4$—6 AU 6

Diode:
- $D_1$—1N463A

It will be appreciated that the call diverter of this inverter of this invention may be provided with additional safety switches, controls, and the like circuity for releasing the various components from the system in the event of faulty switching, power failures or the like.

It will be apparent from the foregoing detailed description and operation of the preferred embodiments of our invention as depicted in the accompanying drawings, that our semiautomatic diverter connects or relays any incoming calls to one of the subscriber's telephones to a selected remote telephone, yet does not require special central telephone facilities, central memory facilities, leased lines or complex switch board apparatus.

While the novel features of the invention have been shown and described and are pointed out in the appended claims, it is to be understood that various omissions, substitutions and changes in construction and arrangement of the features shown and described may be made by those skilled in the art without departing from the spirit and scope of the invention.

What is claimed is:

1. A semiautomatic diverter for diverting telephone calls comprising in combination:

(a) first and second telephones located at a preselected site;

(b) a manually actuated call holding device coupled to said first telephone for maintaining a telephone link between the first telephone and a randomly remotely located third telephone, after the third telephone has established a telephone link with the first telephone;

(c) manually actuated means associated with said second telephone for establishing a telephone link between the second telephone and a selected remotely located fourth telephone;

(d) a manually actuated transfer device coupled between the first and second telephones for establishing a telephone link therebetween after establishment of the telephone link between the second telephone and the fourth telephone, thereby providing a telephone link between the third and fourth telephones via the telephone link between said first and second telephones;

(e) a monitoring means coupled to said transfer device for detecting audio frequencies in the telephone link between said third and fourth telephones; and (f) deactuating means operatively associated with said monitoring means for deactuating the transfer device whereby the telephone link between the third and fourth telephones is broken, said deactuating means including a timer means which is actuated by the monitoring means when no audio frequencies are detected by said monitoring means, said timer means upon being actuated maintaining a predetermined delay period before said transfer device is deactuated.

2. The semiautomatic diverter of claim 1 which further comprises:

(a) a first visual indicator operatively associated with the call holding device for indicating that said third telephone has caused ringing of said first telephone; and (b) a second visual indicator operatively associated with the call holding device for indicating that said holding device is maintaining a telephone link between the first telephone and the randomly located third telephone.

3. The semiautomatic diverter of claim 1 which further comprises another telephone means located at a site remote from the first and second telephones that is adapted to be coupled thereto so that the telephone circuitry of the first and second telephones are replaced by said other telephone means and a call selecting device operatively associated with said first and second telephones, said other telephone means, said transfer device and said call holding device for coupling said other telephone means to said first and second telephones and for actuating said call holding means and said transfer device whereby incoming calls from said third telephone can be diverted to said fourth telephone via said other telephone means.

References Cited

UNITED STATES PATENTS

| | | | |
|---|---|---|---|
| 2,395,155 | 2/1946 | Voss | 179—27 |
| 2,952,744 | 9/1960 | Semon | 179—42 |
| 2,719,883 | 10/1955 | Reagan | 179—42 |
| 3,057,963 | 10/1962 | Gray | 179—42 |
| 3,096,404 | 7/1963 | Semon | 179—42 |
| 3,113,185 | 12/1963 | Semon | 179—42 |

WILLIAM C. COOPER, Primary Examiner

U.S. Cl. X.R.

179—27